(12) United States Patent
Huang et al.

(10) Patent No.: US 9,245,166 B2
(45) Date of Patent: Jan. 26, 2016

(54) OPERATING METHOD BASED ON FINGERPRINT AND GESTURE RECOGNITION AND ELECTRONIC DEVICE

(71) Applicant: Wistron Corporation, New Taipei (TW)

(72) Inventors: Xin-Jian Huang, New Taipei (TW); Ming-Xing Ji, New Taipei (TW)

(73) Assignee: Wistron Corporation, New Taipei (TW)

( * ) Notice: Subject to any disclaimer, the term of this patent is extended or adjusted under 35 U.S.C. 154(b) by 181 days.

(21) Appl. No.: 13/855,715

(22) Filed: Apr. 3, 2013

(65) Prior Publication Data

US 2014/0218311 A1    Aug. 7, 2014

(30) Foreign Application Priority Data

Feb. 7, 2013    (CN) .......................... 2013 1 0049865

(51) Int. Cl.
*G06K 9/00* (2006.01)
*G06F 21/32* (2013.01)
*G06F 3/0488* (2013.01)

(52) U.S. Cl.
CPC ............ *G06K 9/00013* (2013.01); *G06F 21/32* (2013.01); *G06F 3/0488* (2013.01)

(58) Field of Classification Search
CPC ................ G06K 9/00013; G06F 21/32; G06F 2203/0338
USPC .................................................. 345/173–178
See application file for complete search history.

(56) References Cited

U.S. PATENT DOCUMENTS

| 6,360,004 | B1 | 3/2002 | Akizuki | |
|---|---|---|---|---|
| 2002/0163506 | A1* | 11/2002 | Matusis | 345/173 |
| 2006/0066588 | A1* | 3/2006 | Lyon et al. | 345/173 |
| 2006/0285729 | A1* | 12/2006 | Kim | G06K 9/00026 382/124 |
| 2009/0138725 | A1* | 5/2009 | Madhvanath et al. | 713/186 |
| 2013/0076485 | A1* | 3/2013 | Mullins | 340/5.83 |
| 2014/0003680 | A1* | 1/2014 | Marciniak et al. | 382/124 |
| 2014/0208434 | A1* | 7/2014 | Brouwer et al. | 726/26 |

FOREIGN PATENT DOCUMENTS

CN    102135800    7/2011

OTHER PUBLICATIONS

"Office Action of Taiwan Counterpart Application," issued on Nov. 26, 2014, with English translation thereof, p. 1-p. 15.

* cited by examiner

*Primary Examiner* — Koosha Sharifi-Tafreshi
*Assistant Examiner* — Chun-Nan Lin
(74) *Attorney, Agent, or Firm* — Jianq Chyun IP Office

(57) ABSTRACT

An operating method of an electronic device having a fingerprint sensor unit is provided. In the operating method, a touch action of an input device is sensed and a touch signal is generated by the fingerprint sensor unit. A fingerprint analysis and an action analysis are performed according to the touch signal to determine a finger category of the input device and an action information of the touch action. An operation corresponding to the finger category and the action information is executed.

14 Claims, 4 Drawing Sheets

OPERATING METHOD BASED ON FINGERPRINT AND GESTURE RECOGNITION AND ELECTRONIC DEVICE

CROSS-REFERENCE TO RELATED APPLICATION

This application claims the priority benefit of China application serial no. 201310049865.2, filed on Feb. 7, 2013. The entirety of the above-mentioned patent application is hereby incorporated by reference herein and made a part of this specification.

BACKGROUND OF THE INVENTION

1. Field of the Invention

The present invention generally relates to an operating method and an electronic device, and more particularly, to an operating method based on fingerprint and gesture recognition and an electronic device.

2. Description of Related Art

Along with the functional diversification of electronic devices, conventional operation interfaces, such as mouses and keyboards, no longer meet user requirements. Accordingly, touch panels have been rapid developed. Compared to that of aforementioned conventional operation interfaces, the operation of touch panels is simple and straight-forward. By simply touching a touch panel, a user can directly select objects, menus, or figures displayed on the screen with his finger or a stylus or operate aforementioned objects, menus, or figures with different gestures.

However, an existing touch panel can only operate regarding each pre-defined gesture. Namely, each gesture is corresponding to one operation. Usually, when a user performs a gesture to operate a touch panel, the operation of a software has to be involved to correspond the gesture to more than one operation.

SUMMARY OF THE INVENTION

Accordingly, the present invention is directed to an operating method, in which different operation results are produced by using different fingers and different touch actions of these fingers, so that finger operation and control is diversified.

The present invention is directed to an electronic device, in which a fingerprint sensor unit is adopted to provide a diversified touch control functionality, and the electronic device is made very durable and convenient.

The present invention provides an operating method suitable for an electronic device having a fingerprint sensor unit. In the operating method, a touch action of an input device is sensed and a touch signal is generated by the fingerprint sensor unit. A fingerprint analysis and an action analysis are performed according to the touch signal to determine a finger category of the input device and an action information of the touch action. An operation corresponding to the finger category and the action information is executed.

According to an embodiment of the present invention, in the operating method, the electronic device includes a storage unit, and the storage unit stores a fingerprint information of at least one finger of at least one user. The fingerprint analysis includes following steps. A plurality of continuous touch images of a touch area of the fingerprint sensor unit which the input device touches during the touch action is obtained according to the touch signal. An image processing is performed to integrate the touch images into an integrated image according to a relative position of the touch area. The integrated image is compared with the fingerprint information in the storage unit to determine one of the fingerprint information that is corresponding to the integrated image, and the finger corresponding to the fingerprint information is served as the finger category of the input device.

According to an embodiment of the present invention, in the operating method, the finger category includes a right thumb, a right index finger, a right middle finger, a right ring finger, a right little finger, a left thumb, a left index finger, a left middle finger, a left ring finger, or a left little finger.

According to an embodiment of the present invention, before the step of performing the fingerprint analysis and the action analysis, the operating method further includes following steps. An action trajectory area of the fingerprint sensor unit which the input device touches during the touch action is determined according to the touch signal. Whether the touch action is valid is determined according to the action trajectory area. When the touch action is valid, the fingerprint analysis and the action analysis are performed. The touch action is determined to be valid when the action trajectory area is between $3\times6$ mm$^2$ and $8\times15$ mm$^2$.

According to an embodiment of the present invention, after the step of determining whether the touch action is valid and before the step of performing the fingerprint analysis and the action analysis, the operating method further includes following steps. Whether the electronic device is in a lock state is determined. When the electronic device is in the lock state, an unlocking procedure is performed according to the touch signal. When the electronic device is not in the lock state, the fingerprint analysis and the action analysis are performed.

According to an embodiment of the present invention, in the operating method, the unlocking procedure includes following steps. A touch image of a touch area of the fingerprint sensor unit which the input device touches is obtained according to the touch signal. Whether the touch image is corresponding to an unlocking password of the lock state is determined. When the touch image is corresponding to the unlocking password, the electronic device is unlocked. When the touch image is not corresponding to the unlocking password, another touch signal generated when the fingerprint sensor unit senses another touch action of the input device is waited for.

According to an embodiment of the present invention, the operating method further includes an initial setting procedure. In the initial setting procedure, a fingerprint information is recorded when each finger of a user touches the fingerprint sensor unit, and the operation corresponding to each of the fingerprint information accompanied by different the action information is respectively configured.

The present invention provides an electronic device including a fingerprint sensor unit and a processor. The fingerprint sensor unit senses a touch action of an input device to generate a touch signal. The processor performs a fingerprint analysis and an action analysis according to the touch signal to determine a finger category of the input device and an action information of the touch action, and the processor executes an operation corresponding to the finger category and the action information.

According to an embodiment of the present invention, the electronic device further includes a storage unit. The storage unit stores a fingerprint information of at least one finger of at least one user. The processor obtains a plurality of continuous touch images of a touch area of the fingerprint sensor unit which the input device touches during the touch action according to the touch signal. The processor performs an image processing to integrate the touch images into an integrated image according to a relative position of the touch area. The processor compares the integrated image with the fingerprint information in the storage unit to determine one of the fingerprint information that is corresponding to the integrated image and serves the finger corresponding to the fingerprint information as the finger category of the input device.

According to an embodiment of the present invention, in the electronic device, the finger category includes a right thumb, a right index finger, a right middle finger, a right ring finger, a right little finger, a left thumb, a left index finger, a left middle finger, a left ring finger, or a left little finger.

According to an embodiment of the present invention, in the electronic device, before the processor performs the fingerprint analysis and the action analysis, the processor further determines an action trajectory area of the fingerprint sensor unit which the input device touches during the touch action according to the touch signal, determines whether the touch action is valid according to the action trajectory area, and performs the fingerprint analysis and the action analysis when the touch action is valid.

According to an embodiment of the present invention, in the electronic device, the touch action is determined to be valid when the action trajectory area is between 3×6 mm$^2$ and 8×15 mm$^2$.

According to an embodiment of the present invention, in the electronic device, after the processor determines whether the touch action is valid and before the processor performs the fingerprint analysis and the action analysis, the processor further determines whether the electronic device is in a lock state, performs an unlocking procedure according to the touch signal when the electronic device is in the lock state, and performs the fingerprint analysis and the action analysis when the electronic device is not in the lock state.

According to an embodiment of the present invention, in the unlocking procedure, the processor obtains a touch image of a touch area of the fingerprint sensor unit which the input device touches according to the touch signal, determines whether the touch image is corresponding to an unlocking password of the lock state, unlocks the electronic device when the touch image is corresponding to the unlocking password, and waits to receive another touch signal generated by the fingerprint sensor unit at the sensing of another touch action of the input device when the touch image is not corresponding to the unlocking password.

According to an embodiment of the present invention, in the electronic device, the processor further records a fingerprint information when each finger of a user touches the fingerprint sensor unit and respectively configures the operation to be corresponding to each of the fingerprint information accompanied by different the action information.

As described above, in the present invention, different fingers of a user and different touch actions of the fingers are corresponding to different operations. Thus, the user can define the operations and functions corresponding to different gesture inputs to diversify the finger operation and control. Additionally, a fingerprint sensor unit is adopted in an in an electronic device provided by the present invention. The fingerprint sensor unit can be disposed in the electronic device or connected to the electronic device externally. The adopted of the fingerprint sensor unit makes the selection of different components very convenient and flexible and reduces the manufacturing cost. Moreover, compared to the conventional keyboards and mouses, the fingerprint sensor unit is more durable therefore reduces the failure rate of the electronic device.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
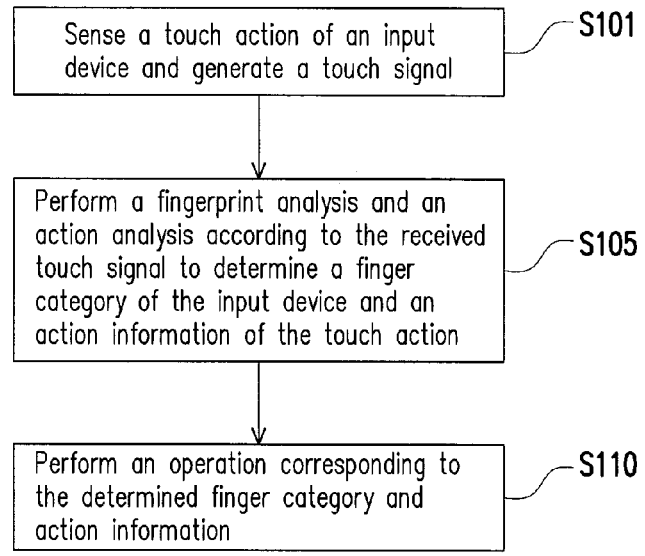
FIG. 1 is a flowchart of an operating method according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
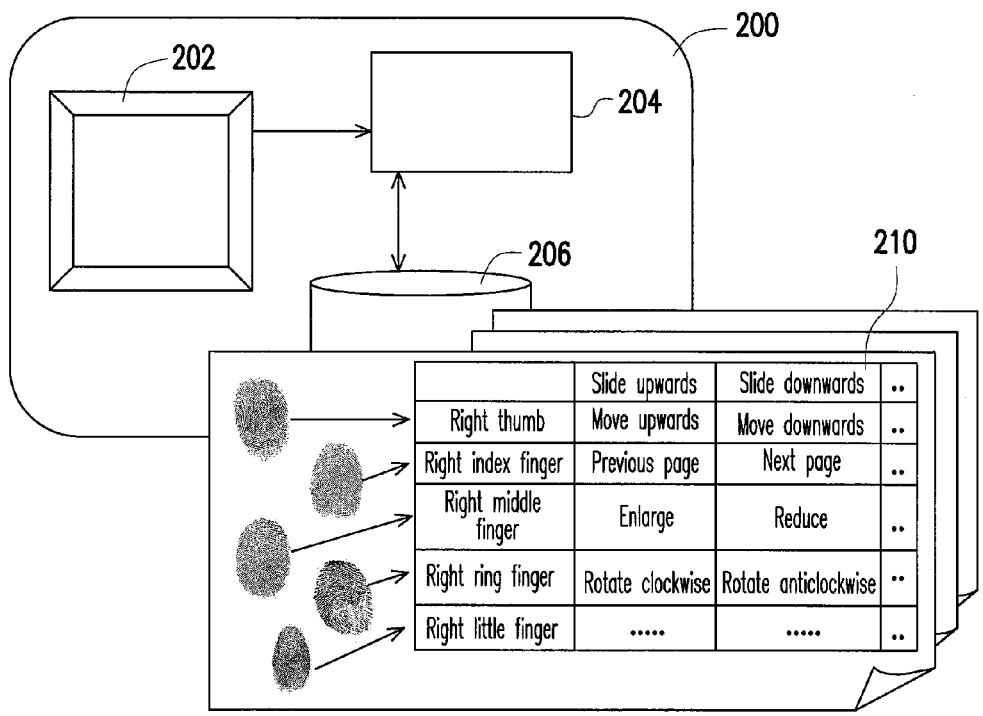
FIG. 2 is a diagram of an electronic device according to an embodiment of the invention.

FIG. 1 is a flowchart of an operating method according to an embodiment of the invention. FIG. 2 is a diagram of an electronic device according to an embodiment of the invention. Referring to both FIG. 1 and FIG. 2, the electronic device 200 in the present embodiment includes a fingerprint sensor unit 202, a processor 204, and a storage unit 206. The operating method in the present embodiment is suitable for the electronic device 200 having the fingerprint sensor unit 202. The fingerprint sensor unit 202 may be an optical fingerprint recognizer, a capacitive sensor, a radio frequency (RF) fingerprint recognizer, or a digital optical fingerprint recognizer In the embodiment illustrated in FIG. 2, the fingerprint sensor unit 202 is disposed in the electronic device 200. However, the present invention is not limited thereto. The fingerprint sensor unit 202 may also be connected to the electronic device 200 externally (for example, the fingerprint sensor unit 202 is externally connected to the electronic device 200 in a plug-and-play manner by using a universal serial bus (USB)) according to the actual requirement. The electronic device 200 may be a portable device, such as a tablet computer, a personal computer, a personal digital assistant (PDA), a smart phone, or a mobile device. In other words, the electronic device 200 is any electronic device with a fingerprint sensor unit.

In step S101, the fingerprint sensor unit 202 senses a touch action of an input device and generates a touch signal. The input device may be any finger of a user. In step S105, the processor 204 performs a fingerprint analysis and an action analysis according to the received touch signal to determine a finger category of the input device and an action information of the touch action. The touch signal carries touch action information and touch area information of the input device when the input device touches the fingerprint sensor unit 202. Namely, the processor 204 respectively performs the fingerprint analysis and the action analysis according to the touch area information and the touch action information in the touch signal. Besides, the touch area information may be a plurality of continuous fingerprint images of a fingerprint on a touch area of the fingerprint sensor unit 202 which a user's finger touches during the touch action. On the other hand, the touch area information may be one of the continuous fingerprint images of the fingerprint on the touch area of the fingerprint sensor unit 202 which the user's finger touches during the touch action. Additionally, the finger category includes a right thumb, a right index finger, a right middle finger, a right ring finger, a right little finger, a left thumb, a left index finger, a left middle finger, a left ring finger, or a left little finger. Namely, when the processor 204 performs the fingerprint analysis, it determines which finger (finger category) of the user the input device is. Moreover, the action information may be any touch control operation, such as sliding upwards, sliding downwards, sliding leftwards, sliding rightwards, or circling.

Next, in step S110, the processor 204 performs an operation corresponding to the determined finger category and action information. To be specific, the storage unit 206 stores at least one finger category-action information mapping table 210 (as shown in FIG. 2). Namely, after the processor 204 performs the fingerprint analysis and the action analysis according to the touch signal and determines the finger category of the input device and the action information of the touch action, it determines the operation corresponding to specific finger category and specific action information by looking up the finger category-action information mapping table 210. For example, when the input device is determined to be the right middle finger and the touch action is determined to be sliding upwards, the operation corresponding to the right middle finger and the sliding upwards action is to enlarge the currently displayed image.

Figure 3:
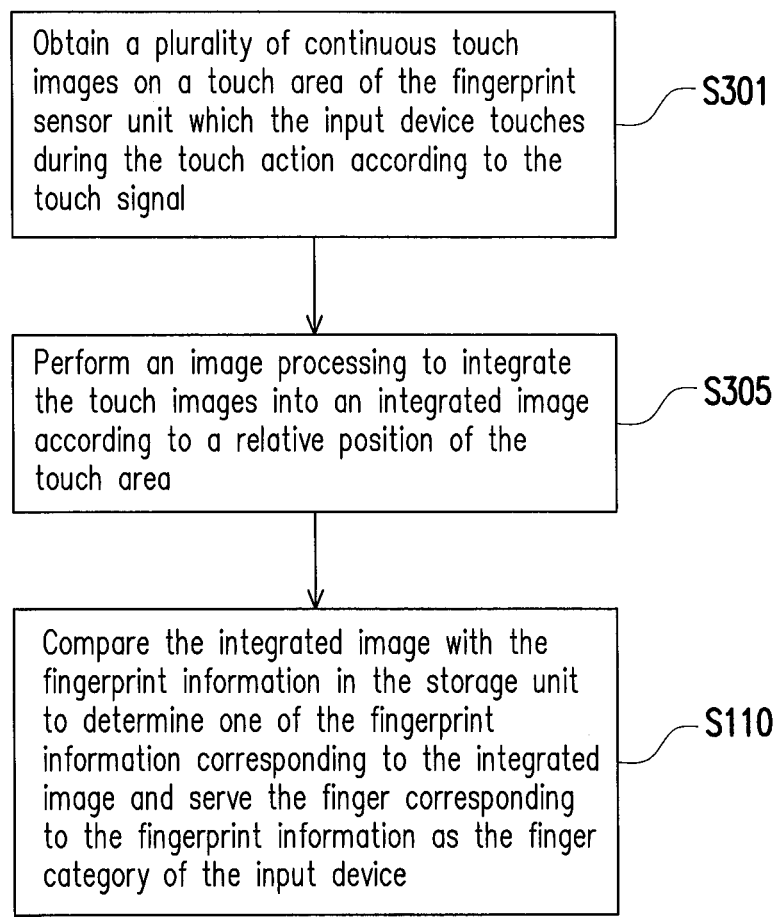
FIG. 3 is a flowchart of a fingerprint analysis according to an embodiment of the invention.

Additionally, besides the finger category-action information mapping table 210, the storage unit 206 also stores a fingerprint information of at least one finger of at least one user. The fingerprint information may be the fingerprint pattern of each finger of a user (for example, the fingerprint patterns respectively corresponding to different finger categories at the left side of the finger category-action information mapping table 210 in FIG. 2). Below, the fingerprint analysis will be explained with reference to an embodiment and FIG. 3. FIG. 3 is a flowchart of a fingerprint analysis according to an embodiment of the invention. Referring to FIG. 3 and FIG. 2, in step S301, the processor 204 obtains a plurality of continuous touch images on a touch area of the fingerprint sensor unit 202 which the input device touches during the touch action according to the received touch signal. Namely, during the touch action, dynamic fingerprint images on the touch area are continuously recorded when the user's finger slides on the fingerprint sensor unit 202. After that, in step S305, the processor 204 performs an image processing to integrate the dynamic touch images on the touch area into an integrated image according to a relative position of the touch area. To be specific, the touch images are aligned based on at least one relative position of the touch images and stacked together to form an integrated image. The integrated image is a fingerprint image of the input device (the user's finger) on the touch area of the fingerprint sensor unit 202.

Next, in step S310, the processor 204 compares the integrated image with all the fingerprint information in the storage unit to determine a fingerprint information corresponding to the integrated image and serves the finger corresponding to the fingerprint information as the finger category of the input device. For example, the technique of comparing the integrated image with all the fingerprint information in the storage unit includes comparing individual fingerprint pattern characteristic (including image centers (up and down) and triangulation points (left and right), etc) and specific feature points (including starting points, end points, junctions, and breakout points of ridges) of the integrated image and the fingerprint information to determine that the integrated image and one of the fingerprint information come from the same fingerprint (i.e., the integrated image and one of the fingerprint information come from the same finger. It should be noted that aforementioned fingerprint ridges includes loop, arch, and whorl.

Figure 4:
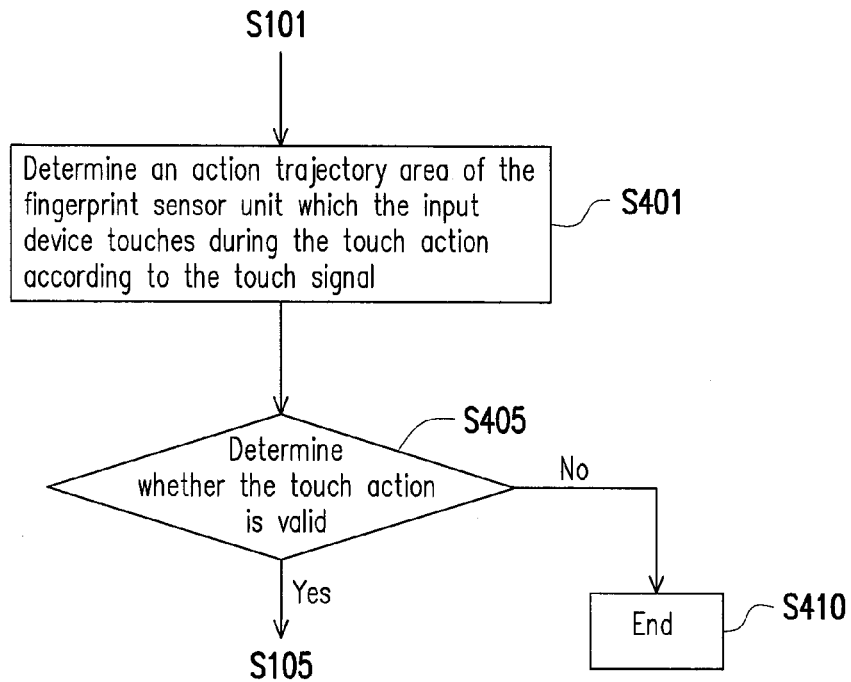
FIG. 4 is a flowchart illustrating how to determine whether a touch action is valid or not according to an embodiment of the invention.

Below, how the processor 204 determines whether the touch action of the input device on the fingerprint sensor unit 202 is valid before performing the fingerprint analysis and the action analysis will be explained with reference to an embodiment and FIG. 4. FIG. 4 is a flowchart illustrating how to determine whether a touch action is valid or not according to an embodiment of the invention. Referring to FIG. 4, after the fingerprint sensor unit 202 senses the touch signal of the input device and generates the touch signal (step S101), in step S401, the processor 204 determines an action trajectory area of the fingerprint sensor unit which the input device touches during the touch action according to the touch signal. Then, in step S405, the processor 204 determines whether the touch action is valid according to the action trajectory area. For example, the touch action is determined to be valid when the action trajectory area is between 3×6 $mm^2$ and 8×15 $mm^2$. Namely, when the touch area is within a predetermined range (for example, 3×6 $mm^2$ to 8×15 $mm^2$), the continuous touch action of the input device on the fingerprint sensor unit 202 corresponding to the action trajectory is considered a meaningful and valid touch action, so that any misoperation won't be considered a touch action of the input device. When the touch action is determined to be valid, the processor 204 performs the fingerprint analysis and the action analysis (i.e., step S105). On the other hand, when the touch action is determined to be invalid, the processor 204 ends the operating method (step S410) and won't perform the fingerprint analysis or the action analysis.

Figure 5:
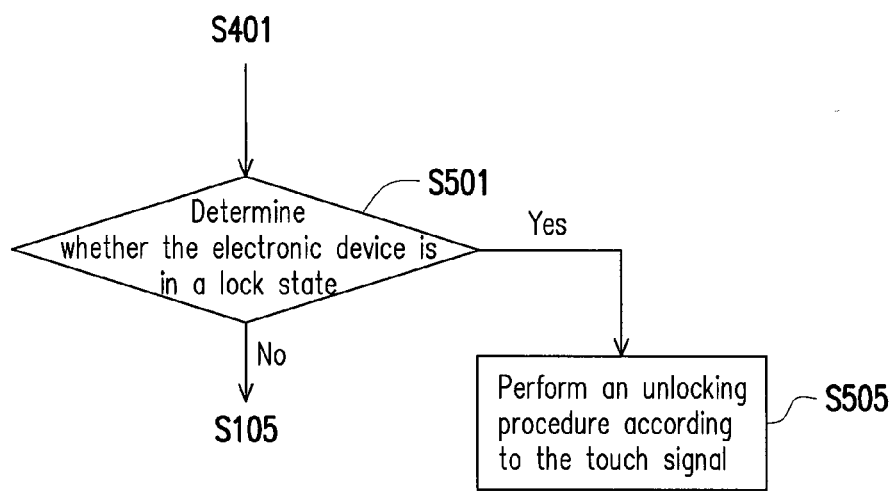
FIG. 5 is a flowchart illustrating how to determine whether an electronic device is in a lock state or not according to an embodiment of the invention.

Below, how the processor 204 determines whether the electronic device is in a lock state after determining whether the touch action is valid and before performing the fingerprint analysis and the action analysis will be explained with reference to an embodiment and FIG. 5. FIG. 5 is a flowchart illustrating how to determine whether an electronic device is in a lock state or not according to an embodiment of the invention. Referring to FIG. 5, after determining whether the touch action is valid (step S405) and before performing the fingerprint analysis and the action analysis (step S105), the processor 204 further determines whether the electronic device 200 is in a lock state (step S501). When the processor 204 determines that the electronic device 200 is not in the lock state, it performs the fingerprint analysis and the action analysis (step S105). However, in step S505, when the processor 204 determines that the electronic device 200 is in the lock state, it performs an unlocking procedure according to the touch signal.

Figure 6:
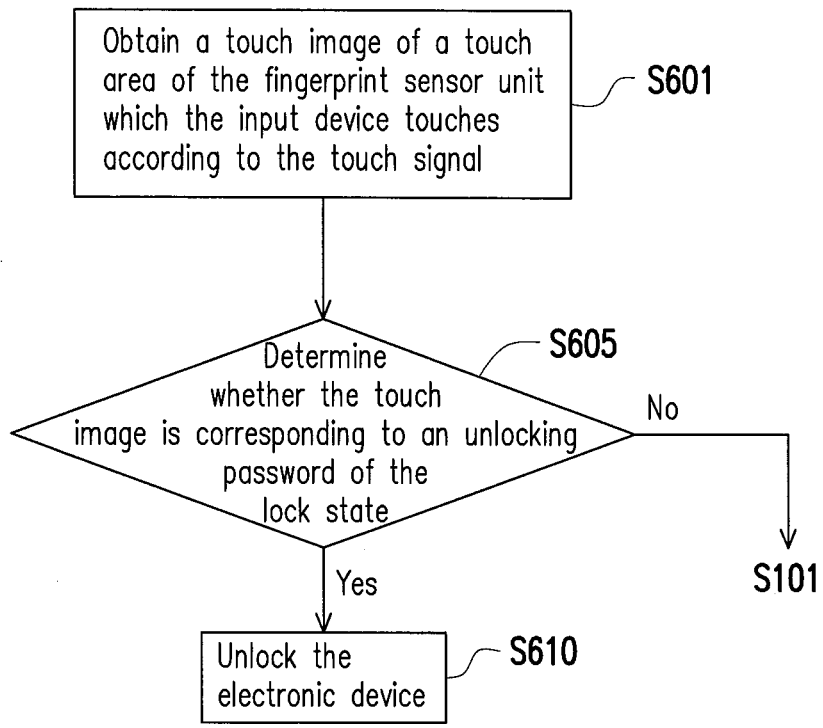
FIG. 6 is a flowchart of an unlocking procedure according to an embodiment of the invention.

FIG. 6 is a flowchart of an unlocking procedure according to an embodiment of the invention. Referring to FIG. 6, in step S601, the processor 204 obtains a touch image (for example, the integrated image formed by a plurality of continuous touch images of the touch area or one of the touch images) of a touch area of the fingerprint sensor unit 202 which the input device touches according to the touch signal.

Thereafter, in step S605, the processor 204 determines whether the touch image is corresponding to an unlocking password of the lock state. Namely, the fingerprint of a finger of the user is used as the unlocking password of the electronic device 200. In step S610, when the touch image is corresponding to the unlocking password (i.e., it is determined that the touch image and the unlocking password come from the same fingerprint after comparing the touch image and the unlocking password), the processor 204 unlocks the electronic device. On the other hand, when the touch image is not corresponding to the unlocking password, the processor 204 waits to receive another touch signal generated by the fingerprint sensor unit 202 at the sensing of another touch action of the input device (i.e., returns to step S101).

Figure 7:
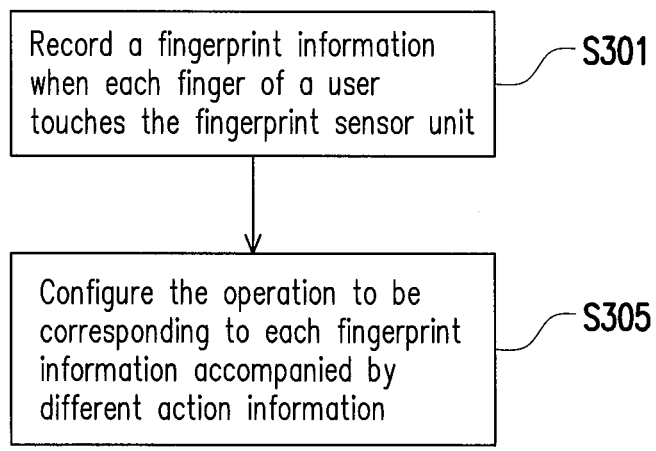
FIG. 7 is a flowchart of an initial setting procedure according to an embodiment of the invention.

FIG. 7 is a flowchart of an initial setting procedure according to an embodiment of the invention. In the operating method provided by the present invention, the processor 204 further performs an initial setting procedure to establish the finger category-action information mapping table 210 (as shown in FIG. 2) in the storage unit 206, so that in the operating method performed subsequently, after the touch signal is received and the finger category of the input device and the action information of the touch action of the input device are determined, the operation corresponding to specific finger category and specific action information can be obtained by looking up the finger category-action information mapping table 210. Referring to FIG. 7, in step S701, the processor 204 records a fingerprint information (for example a fingerprint image of the touch area of the fingerprint sensor unit 202 which the finger touches) when each finger of a user touches the fingerprint sensor unit 202. After that, in step S705, the processor 204 respectively configures the operation to be corresponding to each fingerprint information accompanied by different action information, so as to establish the finger category-action information mapping table 210, and the processor 204 stores the finger category-action information mapping table 210 into the storage unit 206.

As described above, in the present invention, different fingers of a user and different touch actions of the fingers are corresponding to different operations. Thus, the user can define the operations and functions corresponding to different gesture inputs to diversify the finger operation and control. Additionally, a fingerprint sensor unit is adopted in an in an electronic device provided by the present invention. The fingerprint sensor unit can be disposed in the electronic device or connected to the electronic device externally. The adopted of the fingerprint sensor unit makes the selection of different components very convenient and flexible and reduces the manufacturing cost. Moreover, compared to the conventional keyboards and mouses, the fingerprint sensor unit is more durable therefore reduces the failure rate of the electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An operating method, suitable for an electronic device having a fingerprint sensor unit, the operating method comprising:
   sensing a touch action of an input device to generate a touch signal by using the fingerprint sensor unit;
   determining an action trajectory area touched by the input device on the fingerprint sensor unit during the touch action according to the touch signal;
   determining whether the touch action is valid according to the action trajectory area;
   performing a fingerprint analysis and an action analysis according to the touch signal to determine a finger category of the input device and an action information of the touch action upon determining the touch action is valid; and
   executing an operation corresponding to the finger category and the action information.

2. The operating method according to claim 1, wherein the electronic device comprises a storage unit, the storage unit stores a fingerprint information of at least one finger of at least one user, and the fingerprint analysis comprises:
   obtaining a plurality of continuous touch images of a touch area of the fingerprint sensor unit which the input device touches during the touch action according to the touch signal;
   performing an image processing to integrate the touch images into an integrated image according to a relative position of the touch area; and
   comparing the integrated image with the fingerprint information in the storage unit to determine one of the fingerprint information that is corresponding to the integrated image, and serving the finger corresponding to the fingerprint information as the finger category of the input device.

3. The operating method according to claim 1, wherein the finger category comprises a right thumb, a right index finger, a right middle finger, a right ring finger, a right little finger, a left thumb, a left index finger, a left middle finger, a left ring finger, and a left little finger.

4. The operating method according to claim 1, wherein the touch action is determined to be valid when the action trajectory area is between $3 \times 6$ mm$^2$ and $8 \times 15$ mm$^2$.

5. The operating method according to claim 1, wherein after the step of determining whether the touch action is valid and before the step of performing the fingerprint analysis and the action analysis, the operating method further comprises:
   determining whether the electronic device is in a lock state;
   when the electronic device is in the lock state, performing an unlocking procedure according to the touch signal; and
   when the electronic device is not in the lock state, performing the fingerprint analysis and the action analysis.

6. The operating method according to claim 5, wherein the unlocking procedure comprises:
   obtaining a touch image of a touch area of the fingerprint sensor unit which the input device touches according to the touch signal;
   determining whether the touch image is corresponding to an unlocking password of the lock state;
   when the touch image is corresponding to the unlocking password, unlocking the electronic device; and
   when the touch image is not corresponding to the unlocking password, waiting for another touch signal generated when the fingerprint sensor unit senses another touch action of the input device.

7. The operating method according to claim 1 further comprising an initial setting procedure:
   recording a fingerprint information when each finger of a user touches the fingerprint sensor unit; and
   respectively configuring the operation corresponding to each of the fingerprint information and different one of the action information.

8. An electronic device, comprising:
a fingerprint sensor unit, sensing a touch action of an input device to generate a touch signal; and
a processor, determining an action trajectory area touched by the input device on the fingerprint sensor unit during the touch action according to the touch signal, determining whether the touch action is valid according to the action trajectory area, performing a fingerprint analysis and an action analysis according to the touch signal to determine a finger category of the input device and an action information of the touch action upon determining the touch action is valid, and executing an operation corresponding to the finger category and the action information.

9. The electronic device according to claim 8 further comprising a storage unit, wherein the storage unit stores a fingerprint information of at least one finger of at least one user, and the processor obtains a plurality of continuous touch images of a touch area of the fingerprint sensor unit which the input device touches during the touch action according to the touch signal, performs an image processing to integrate the touch images into an integrated image according to a relative position of the touch area, compares the integrated image with the fingerprint information in the storage unit to determine one of the fingerprint information that is corresponding to the integrated image, and serves the finger corresponding to the fingerprint information as the finger category of the input device.

10. The electronic device according to claim 8, wherein the finger category comprises a right thumb, a right index finger, a right middle finger, a right ring finger, a right little finger, a left thumb, a left index finger, a left middle finger, a left ring finger, and a left little finger.

11. The electronic device according to claim 8, wherein the touch action is determined to be valid when the trajectory area is between $3 \times 6$ mm$^2$ and $8 \times 15$ mm$^2$.

12. The electronic device according to claim 8, wherein after the processor determines whether the touch action is valid and before the processor performs the fingerprint analysis and the action analysis, the processor further determines whether the electronic device is in a lock state, performs an unlocking procedure according to the touch signal when the electronic device is in the lock state, and performs the fingerprint analysis and the action analysis when the electronic device is not in the lock state.

13. The electronic device according to claim 12, wherein during the unlocking procedure, the processor obtains a touch image of a touch area of the fingerprint sensor unit which the input device touches according to the touch signal, determines whether the touch image is corresponding to an unlocking password of the lock state, unlocks the electronic device when the touch image is corresponding to the unlocking password, and waits to receive another touch signal generated by the fingerprint sensor unit at the sensing of another touch action of the input device when the touch image is not corresponding to the unlocking password.

14. The electronic device according to claim 8, wherein the processor further records a fingerprint information when each finger of a user touches the fingerprint sensor unit and respectively configures the operation to be corresponding to each of the fingerprint information accompanied by different action information.

* * * * *